William H. Baskervill
INVENTOR
BY Arthur L. Davis
ATTORNEY

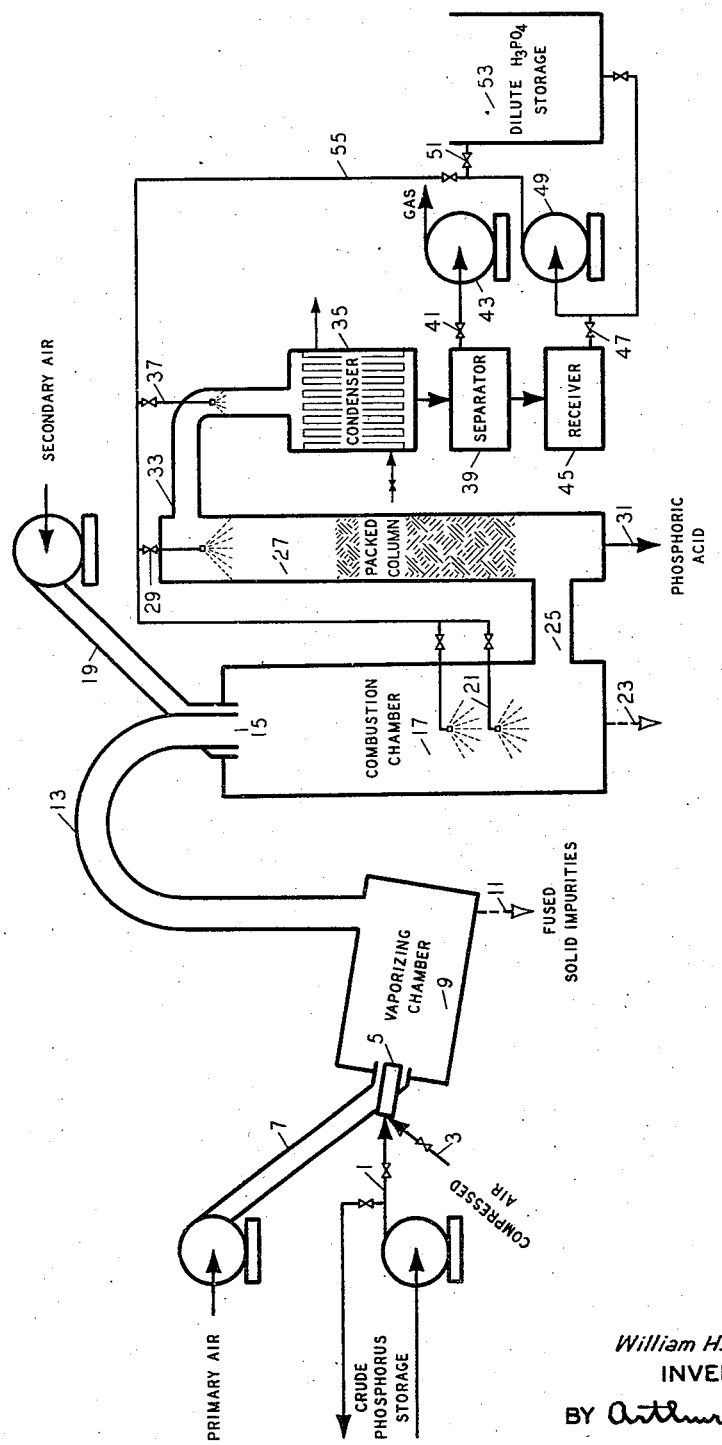

Patented Dec. 1, 1942

2,303,318

UNITED STATES PATENT OFFICE 2,303,318

SEPARATING HYDRATED PHOSPHORUS PENTOXIDE

William H. Baskervill, Knoxville, Tenn.

Application September 3, 1940, Serial No. 355,177

7 Claims. (Cl. 23—165)

(Granted under the act of March 3, 1883, as amended April 30, 1928; 370 O. G. 757)

The invention herein described may be manufactured and used by or for the Government for governmental purposes without the payment to me of any royalty thereon.

This invention relates to the art of making phosphoric acid from elemental phosphorus, particularly the separation of hydrated phosphorus pentoxide obtained after oxidizing elemental phosphorus.

After elemental phosphorus has been oxidized with air to form phosphorus pentoxide and the phosphorus pentoxide has been hydrated, it is well known that various phosphoric acids, which are hydrates of phosphorus pentoxide, may be formed depending upon the conditions of temperature and the amount of water present. However, the most important consideration has been not only the separation of a particular phosphoric acid but the complete recovery of hydrated phosphorus pentoxide in making such separation.

Due to the high heat of combustion of elemental phosphorus, the phosphorus pentoxide and hydrated phosphorus pentoxide in the hot combustion products resulting therefrom have hitherto oftentimes been considered to be in a gaseous state and therefore susceptible to removal by standard gas absorption practice, such as countercurrent flow thru one or a plurality of packed columns, with or without recirculation of contact liquid. The prior art contains several proposals to this effect, but from all information available no such proposal has been either in plant size operations or effective in obtaining any substantial removal of hydrated phosphorus pentoxide in operations on any scale whatsoever.

The hydrated phosphorus pentoxide requiring separation occurs as a dispersoid in the hot gaseous mixture containing the same and not as a true gas. For this reason, electrical precipitation has hitherto been found to be the only effective method for obtaining substantial separation of such hydrated phosphorus pentoxide, in spite of relatively high cost of installation and operation and relatively low capacity of the apparatus required.

I have discovered a process for separating hydrated phosphorus pentoxide from phosphorus combustion products by passing said combustion products upwardly thru a packed separating column, by cooling the top of said column sufficiently to provide a contact liquid over said packing, by maintaining the flow of said combustion products thru said column at a velocity such that said column is maintained just below its loading or flooding point, by regulating the temperature of said combustion products entering said column to a temperature required for the production of a phosphoric acid of the character in which said hydrated phosphorus pentoxide is separated, and by withdrawing said phosphoric acid from near the bottom of said column. In this manner substantially all of the hydrated pentoxide contained in such combustion products may be separated as a phosphoric acid which is one of the hydrates of phosphorus pentoxide or as a mixture of such acids.

In the accompanying drawings which form a part of the specification,

Fig. 1 is a diagrammatical, vertical, sectional view of one form of apparatus for the embodiment of my invention.

Figure 4:
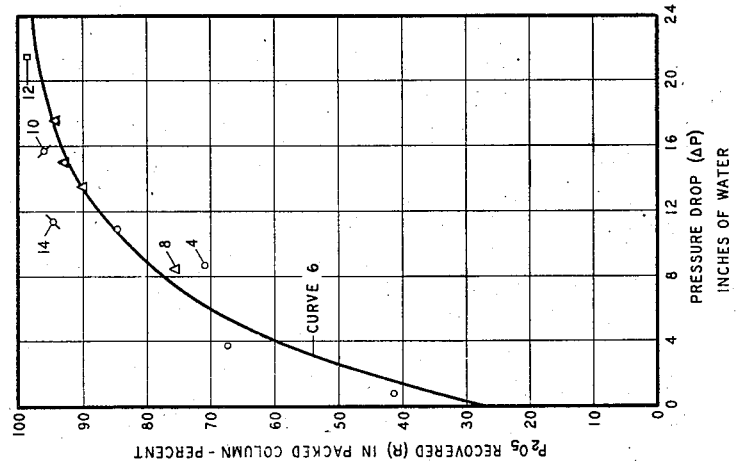
Fig. 4 shows the percent of hydrated phosphorus pentoxide recovered as a function of the pressure drop of the combustion products containing such phosphorus pentoxide in passing thru a packed separating column.

In Fig. 1 elemental phosphorus thru valved line 1 and compressed air thru valved line 3 are delivered to burner 5. The atomized phosphorus together with primary air supplied to burner 5 thru conduit 7 is delivered into vaporizing chamber 9 to produce primary combustion products containing elemental and oxidized phosphorus. When crude phosphorus is used, fused solvent impurities may be withdrawn from time to time from vaporizing chamber 9 thru outlet 11. The primary combustion products from vaporizing chamber 9 are discharged thru conduit 13 into burner 15 into combustion chamber 17. Secondary air for completing the oxidation of phosphorus in the primary combustion products is supplied to burner 15 thru conduit 19. Aqueous liquid for hydrating the phosphorus pentoxide in the combustion products in chamber 17 and partially cooling the same is admitted to said chamber thru a plurality of valved inlets represented by valved inlet 21. Since some liquid and a trace of solid impurities may from time to time accumulate in chamber 17 any such accumulation may be withdrawn from time to time thru outlet 23. The partially cooled combustion products carrying hydrated phosphorus pentoxide are discharged from chamber 17 thru conduit 25 into the bottom of packed separating column 27 so that they may pass countercurrent to contact liquid on the surface of the packing in said column. This contact liquid is provided by supplying a regulated amount of aqueous liquid in the top of the column thru one or a plurality of inlets represented by valved inlet 29. By regulating the temperature of the combustion products passing into the bottom of packed column 27 thru control of the aqueous liquid admitted thru the valved inlets 21 to a temperature required for the production of any particular phosphoric acid, as will hereinafter be described in more detail, such phosphoric acid is produced in column 27 and is withdrawn therefrom thru outlet 31. The velocity of the phosphorus combustion products passing countercurrent to the contact liquid in the packed column 27 is so regulated that the column is maintained just below its loading or flooding point. The residual combustion products reaching the top of column 27 pass thru conduit 33 and are partially cooled by aqueous liquid dispersed therein from valved inlet 37 and pass into condenser 35 to which sufficient cooling fluid is provided to condense only a portion of the water vapor carried in such products around any of the dispersed hydrated phosphorus pentoxide which is contained therein and which has not separated in the packed column. The dilute orthophosphoric acid so produced in condenser 35 together with uncondensed steam and uncondensable gas pass into separator 39 from which the uncondensed steam and uncondensable gas are withdrawn thru valved line 41 into the inlet of exhauster 43 which is used to maintain the proper velocity of combustion products thru packed column 27. The dilute phosphoric acid from separator 39 passes into receiver 45 from which it is withdrawn as required thru valved line 47 to pump 49 which discharges thru valved line 51 either to dilute phosphoric acid storage 53 or thru valved line 55 thru which it passes to one or more of inlets 37, 29, and 21.

One example of the operation of the present invention is given for the continuous separation of hydrated phosphorus pentoxide as ortho-phosphoric acid from hot partially cooled elemental phosphorus combustion products in a semi-plant scale apparatus, substantially as shown in Fig. 1. provided with a separating column packed with one-inch Raschig rings to a height of 18 feet. The hot combustion products, containing 2.29 pounds of $P_2O_5$ per mcf. and cooled to 542° F. (283° C.) were admitted to the bottom of the column and passed therethru at an average velocity of 7.2 feet per second, which was sufficient to maintain said column just below its loading or flooding point in respect to the contact liquid therein. The temperature of the vapors leaving the top of the column was 145° F. (63° C.). A recovery of 94.2% of the hydrated phosphorus pentoxide was obtained in the packed separating column in the form of orthophosphoric acid containing 81% by weight of $H_3PO_4$, which was withdrawn from the bottom of the column. The effectiveness of the present process for separating hydrated phosphorus pentoxide is shown by comparing the results of the above operation with those obtained by the previous operation of the same apparatus in a manner disclosed in the prior art, namely, by operating the packed column as a gas absorption unit. In that operation the hot combustion products containing 2.01 lbs. of $P_2O_5$ per mcf. and cooled to 447° F. (230° C.) were admitted to the bottom of the column and passed therethru at an average velocity of 2.1 ft. per second which is of the order of gas velocities required in gas absorption practice but substantially below the velocity required to maintain the column in a loaded or flooded condition. The temperature at top of the column was 135° F. (57° C.). A recovery of 41.3% of hydrated phosphorus pentoxide was obtained in the packed separating column in the form of orthophosphoric acid containing 83.1% by weight of $H_3PO_4$ which was withdrawn from the bottom of the column. Furthermore, the effectiveness of the present process for separating hydrated phosphorus pentoxide is shown by comparing the results of the operation, according to the first example, by the previous operation of the same apparatus in the manner disclosed in the prior art, namely, by operating the packed column as a gas absorption unit with orthophosphoric acid circulated and recirculated over the packing in said column. In that operation the hot combustion products containing 1.33 lbs. of $P_2O_5$ per mcf. and cooled to 432° F. (222° C.) were admitted to the bottom of the column at an average velocity of 2.8 ft. per second and 84 lbs. per minute of orthophosphoric acid, containing 90.5% by weight of $H_3PO_4$, was admitted to near the top of said column to provide the contact liquid over the packing therein. The temperature at the top of the column was 157° F. (69° C.). No recovery of any of the hydrated phosphorus pentoxide was obtained in the packed separating column.

A second example of the operation of the present invention is given for the continuous separation of hydrated phosphorus pentoxide as orthophosphoric acid from hot partially cooled elemental phosphorus combustion products in a plant scale apparatus, as shown in Fig. 1, provided with a separating column packed with one-inch Raschig rings to a height of 21 feet. The hot combustion products cooled to 500° F. (260° C.) were admitted to the bottom of the column and passed therethru at a velocity such as to maintain said column just below its loading or flooding point in respect to the contact liquid therein. The vapor leaving the top of the column at a temperature of 165° F. (74° C.), containing a very small proportion of the total hydrated phosphorus pentoxide which was admitted to the bottom of the column, was cooled sufficiently to condense only a small portion of the water vapor contained therein around the remaining hydrated phosphorus pentoxide to form dilute orthophosphoric acid. This dilute phosphoric acid was separated and admitted to near the top of the column to provide the small amount of water required to maintain the proper amount of contact liquid within the column. A recovery of 99.1% of the hydrated phosphorus pentoxide was obtained in the form of orthophosphoric acid containing 72% by weight of $H_3PO_4$ which was withdrawn from the bottom of the column. Similarly, effective separation has been obtained in plant scale apparatus using a separating column packed with 2 to 6 inch mesh coke also operated under conditions such that the column was just below its loading or flooding point. During plant scale operations covering a period of 24 months in which elemental phosphorus was burned at a rate of approximately 1000 pounds per hour, four test studies were made each test lasting approximately one week. The concentration of orthophosphoric acid produced during each test period was approximately 80% by weight of $H_3PO_4$ and the overall recoveries of phosphorus pentoxide during the respective test periods were as follows: 99.89%, 99.98%, 99.98% and 99.94%.

The third example of the operation of the present invention is given for the continuous separation of hydrated phosphorus pentoxide as metaphosphoric acid from hot partially cooled elemental phosphorus combustion products in another semi-plant scale apparatus, as shown in Fig. 1, provided with a separating column packed with ½ inch Raschig rings to a height of 10 feet. The hot combustion products cooled to 1380° F. (749° C.) were admitted to the bottom of the column at an average velocity of 6.6 feet per second which was sufficient to maintain said column just below its loading or flooding point. A recovery of 86% of the hydrated phosphorus pentoxide was obtained in the packed separating column in the form of metaphosphoric acid which was withdrawn from the bottom of the column. The same apparatus has also been operated to separate the hydrated phosphorus pentoxide to produce tetraphosphoric acid and pyrophosphoric acid. While the temperature of the hot combustion products entering the bottom of the packed separating column are required to be cooled to about 1380° F. (749° C.) for the production of metaphosphoric acid, these hot combustion products are required to be cooled to about 1100° F. (593° C.) for the production of tetraphosphoric acid and further cooled to a temperature of about 840° F. (449° C.) for the production of pyrophosphoric acid.

A summary of the results obtained in numerous semi-plant scale and plant scale operations showing the recovery of hydrated phosphorus pentoxide as a function of the velocity of combustion products carrying such phosphorus pentoxide through a packed separating column, as a function of the depth of the packing through which the combustion products carrying such phosphorus pentoxide passes through such a separating column, and as a function of the pressure drop of the combustion products carrying such phosphorus pentoxide passing through such separating column is shown in Table 1.

It is evident that there are numerous factors which will influence conditions for the most satisfactory operation of this invention, the actual limits of which cannot be established except by a study of each set of raw materials and the intermediate and finished products involved.

The elemental phosphorus is oxidized to phosphorus pentoxide with at least a sufficient quantity of oxygen in air or from any other source required for the substantially complete conversion of the phosphorus to phosphorus pentoxide. In the production of phosphorus pentoxide, it is common practice to use several hundred per cent excess of air in order that the temperature of the hot gaseous mixture may be materially reduced by the presence of this excess air. However, in the operation of the present process, it is preferred to use a minimum amount of excess air since the required cooling of the hot gaseous mixture is more satisfactorily accomplished by the use of water or other suitable aqueous fluid and the size of the packed confining zone, subsequently required, is reduced to a minimum.

The phosphorus pentoxide in the hot gaseous mixture is completely hydrated and the hot gaseous mixture is partially cooled by the admission of water or suitable aqueous fluid, preferably in the form of a spray in order to obtain more effective contact with the gaseous mixture being treated and to prevent the liquid cooling medium from directly contacting the refractory at high temperature in the combustion and hydration chamber. The temperature to which the hot gaseous mixture is cooled depends upon a number of factors, the more important of which are: the acid, or mixture of acids, which are to be produced; the amount and character of the cooling liquid which is to be used subsequently in maintaining a proper temperature at the point of separation of the acid; and the time of subsequent contact with the contact liquid descending counter-current to the flow of the partially cooled gaseous mixture. In any event, the hot gaseous mixture is generally cooled to a temperature at least slightly above the temperature of the liquid in the bottom of the packed column. The amount of water required for the cooling of the hot gaseous mixture will vary inversely as to the amount of excess air used for the oxidation of elemental phosphorus. In the production of metaphosphoric acid from elemental phosphorus in which a 25% excess of air is used, the amount of water required is in the general order of 17 to 25 lb. mols. for each lb. mol. of elemental phosphorus oxidized. The partial pressure of the water vapor in the partially cooled gaseous mixture will, therefore, substantially depend upon the amount of water which is required for the partial cooling of such mixture.

TABLE 1.—*Separating hydrated phosphorus pentoxide in packed columns as orthophosphoric acid*

| Packing | | Gas temperature °F. | | Column gas velocities ft./sec. | | | Pressure drop ΔP, inches water | $P_2O_5$ content, lbs./M ft.³ | $P_2O_5$ recovered, per cent R | Acid concentration, per cent $H_3PO_4$ |
|---|---|---|---|---|---|---|---|---|---|---|
| Kind | Height ft. h | Inlet | Outlet | Bottom | Top | Ave "$u_{av}$" | | | | |
| Rings 1″ | 9 | 546 | 158 | 8.1 | 5.9 | 7.0 | 8.4 | 2.38 | 75.2 | 81.0 |
| Rings 1″ | 13.5 | 545 | 152 | 8.3 | 5.9 | 7.1 | 13.6 | 2.51 | 90.0 | 82.0 |
| Rings 1″ | 18 | 447 | 135 | 2.5 | 1.7 | 2.1 | 0.8 | 2.01 | 41.3 | 83.1 |
| Rings 1″ | 18 | 444 | 130 | 5.4 | 4.1 | 4.7 | 8.7 | 2.15 | 71.0 | 84.9 |
| Rings 1″ | 18 | 446 | 150 | 6.8 | 5.2 | 6.0 | 10.9 | 2.17 | 84.6 | 86.3 |
| Rings 1″ | 18 | 540 | 145 | 8.5 | 6.0 | 7.2 | 15.0 | 2.33 | 92.8 | 81.5 |
| Rings 1″ | 18 | 542 | 145 | 8.5 | 6.0 | 7.2 | 17.6 | 2.29 | 94.2 | 81.0 |
| Rings 1″ | ¹ 21 | 500 | 165 | | | | 21.5 | | 99.1 | 72.0 |
| Coke ⅜″ | 18 | 444 | 150 | 4.4 | 3.5 | 3.9 | 3.8 | 2.13 | 67.3 | 86.6 |
| Coke ½″ | 18 | 432 | 110 | 2.8 | | | 15.7 | 2.00 | 96.0 | 80.0 |
| Coke 2-6″ | ¹ 17 | 530 | 170 | | | | 11.4 | | 95.7 | 80.8 |

¹ Plant scale apparatus.

Since the partially cooled mixture containing dispersed hydrated phosphorus pentoxide is separated mechanically in the packed separating column, the mechanism by which such dispersed particles are collected is considered to be a series of mechanical impingements, or small-angle centrifugal effects. On this basis the separating or centrifugal force is proportional to the square of the velocity of the gaseous mixture passing through the packed column. The effectiveness of separation, therefore, increases substantially with the increase in velocity of the gaseous mixture passing upwardly through the packed separating column up to the point where said column reaches a loaded or flooded condition. The loading or flooding point of a packed column is the gas velocity upward through such column at which the liquid passing down therethrough starts to be carried out of the column with the gas leaving the packing. Therefore, the critical condition for the operation of the packed separating column is to operate with a gas velocity such that the column is maintained at just below its loading or flooding pint. In operations involving the use of separating columns packed with one-inch Raschig rings, it has been found that a gas velocity of the order of 8 to 10 ft. per second is most satisfactory for this purpose. Such operation is in contra-distinction with the general practice used in the operation of so-called absorption column in which the gas velocity is in the order of a 2 ft. per second. Since the gas velocity through a packed column will vary depending upon the character of the packing, it is standard practice to define this velocity on the basis of the cross section of the empty column. A specified gas velocity for one particular packing will not necessarily be the same for some other packing but there is an equivalent gas velocity for such other packing by which the same effect is produced. Using packing material of a pre-formed or molded type the velocity of gas through the packing is not generally susceptible to material change as long as the packing remains in its original condition. However, using packing material of irregular size and shape, such as coke, gradual rearrangement or disintegration of some of the packing will necessarily change the characteristics of the column. Therefore, as a practical matter in plant operation it is generally preferred to observe the conditions of operation insofar as the approach to the loading or flooding point is concerned by regulating the pressure drop through the packing material. A pressure drop through the packed separating column of the order of 15 to 20 inches of water is generally satisfactory for control of the column just below its loading or flooding point.

Figure 3:
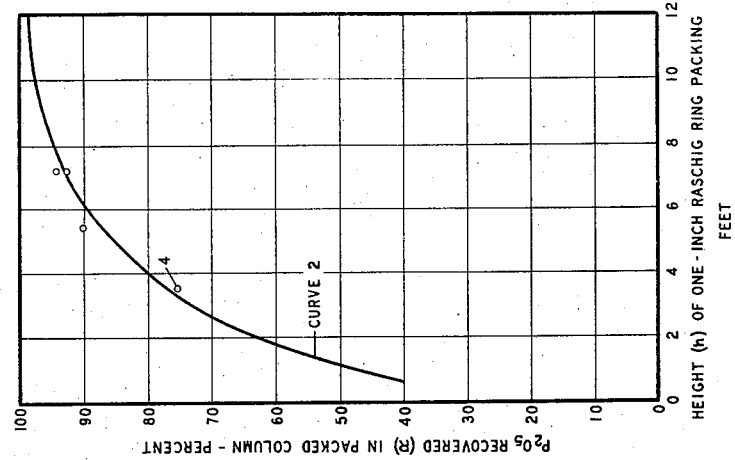
Fig. 3 shows the percent of hydrated phosphorus pentoxide recovered as a function of the depth of packing thru which combustion products carrying such phosphorus pentoxide passes thru a separating column packed with one-inch Raschig rings.
Figure 2:
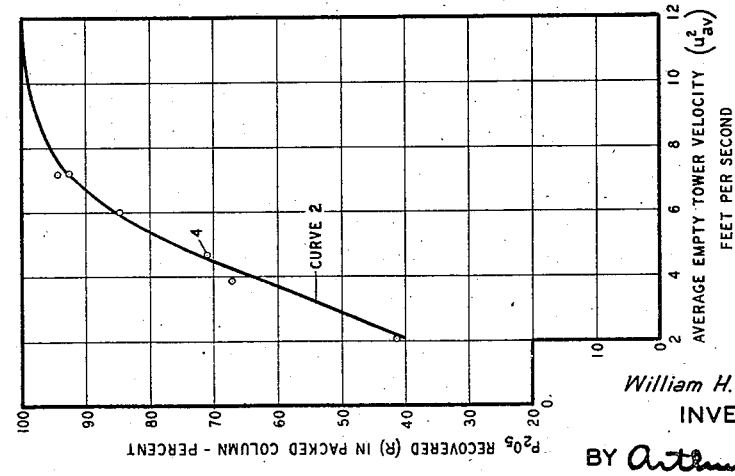
Fig. 2 shows the percent of hydrated phosphorus pentoxide recovered as a function of the velocity of the combustion products carrying such phosphorus pentoxide thru a packed separating column.

In order that a packed separating column may function satisfactorily an adequate supply of contact liquid must be provided over the packing material. In the present process the hot gaseous mixture from which the hydrated phosphorus pentoxide is being separated always contains a substantial quantity of water vapor. One method of supplying contact liquid is to cool the top of the separating column sufficiently to condense a portion of the water vapor contained therein and thereby supply contact liquid in the top of the column. In plant scale operations, however, it is preferable to supply a regulated amount of aqueous liquid to the top of the column to maintain the required amount of contact liquid. In Fig. 2 showing the recovery of hydrated phosphorus pentoxide as a function of a gas velocity through the packed separating column and in Fig. 3 showing the recovery of hydrated phosphorus pentoxide as a function of the height of packing in such a column, curve 2 is a plot of equation (1) $\quad R = 100 - 73 e^{-0.00255\, h u^{2}_{av}}$ which represents the recovery of a dispersiod by a series of mechanical impingements wherein $R$ is the percentage of hydrated phosphorus pentoxide recovered in the column, $e$ is the base of the natural system of logarithms, $h$ is the height in feet of one-inch Raschig rings packing, and $u_{av}$ is the average velocity of the elemental phosphorus combustion products upwardly through the column on an empty-tower basis in feet per second. The corresponding results obtained in semi-plant scale operations using one-inch Raschig rings is shown by a plurality of points represented by point 4.

In Fig. 4 showing the recovery of hydrated phosphorus pentoxide as a function of the pressure drop of a gas through the packed separating column, curve 6 represents a plot of equation (2) $\quad R = 100 - 73 e^{-0.147 \Delta P}$ wherein $R$ is the percentage of hydrated phosphorus pentoxide recovered in the column, $e$ is the base of the natural system of logarithms, and $\Delta P$ is the pressure drop of gas through the column in inches of water. The values obtained in semi-plant scale operations using one-inch Raschig rings to a height of 18 feet are likewise shown by a plurality of points represented by point 4. The values obtained in semi-plant scale operations using the same packing but varying the height of the packing is shown by a plurality of points represented by point 8 and resulting from semi-plant scale operations as a ¾ inch coke packing to a heigth of 18 feet is shown by point 10. The results of plant scale operations obtained in plant scale operations using one-inch Raschig rings to a height of 21 feet is shown by point 12, and the results of plant scale operations using 2 to 6 inch coke packing to a height of 17 feet is shown by point 14.

The composition of the acid in the column may vary from metaphosphoric acid at the bottom of the column to orthophosphoric acid at the top of the column, depending, of course, upon the time of contact of the gas and liquid in the column and the temperature maintained at the bottom of the column. With indirect cooling, some of the metaphosphoric acid in the partially cooled mixture successfully further hydrates to tetraphosphoric acid, pyrophosphoric acid and orthophosphoric acid. With these respective acids, or mixtures of the same, being separated from the mixture as it passes progressively upward thru the column, the orthophosphoric acid separating in the top of the column is then successively dehydrated thru pyrophosphoric acid, tetraphosphoric acid and metaphosphoric acid where the proper conditions are so maintained. Likewise, in the production of other acids, the dehydration will proceed only to the extent required for the respective conditions which are maintained. When it is desired to maintain a definite temperature gradient in the column, direct cooling may be affected by admitting water or other suitable aqueous fluid into the column at the top and/or various elevations in regulated quantities. Such direct cooling will increase the time of contact required by the gas and liquid in the column and increase the temperature required for the gaseous mixture admitted thru the bottom of the column.

The temperature which is to be maintained at the bottom of the column depends primarily upon the acid or mixture of acids which are being produced and the time of contact between the gas and liquid in the column required for such production. The actual temperature required is determined by the partial pressure of the water vapor in the partially cooled gaseous mixture entering the column, the gas velocity thru the column, the amount and character of the cooling agent admitted to the column, if the latter is used, and the proper design of the column. It will be seen, therefore, that the higher the partial pressure of the water vapor in the gaseous mixture entering the column and the greater the amount of cooling liquid entering the column, the higher the gas temperature will be required in the bottom of the column. The examples give a general indication of the magnitude of the temperature at the bottom of the column for the production of the respective individual acids. Likewise, mixtures of at least two individual phosphoric acids may be produced by properly regulating the temperature in the bottom of the column or dilute orthophosphoric acid may be so produced.

The temperature at the top of the packed column is preferably maintained at slightly above the dew point of the gaseous mixture leaving the column. The temperature at the top of the column may, however, be carried at a somewhat higher temperature, in which case it may be desirable to pass the gaseous mixture thru a condenser in which at least a part of the water vapor contained in the hot gaseous mixture is condensed and the small proportion of orthophosphoric acid carried in such mixtures separated out with condensed water. This dilute orthophosphoric acid is an aqueous fluid of suitable character to be used either in the hydration of the phosphorus pentoxide to metaphosphoric acid and the partial cooling of the hot gaseous mixture or in the direct cooling of the packed column.

The following terms mean and include: "phosphoric acid" refers to metaphosphoric acid, tetraphosphoric acid, pyrophosphoric acid, orthophosphoric acid, or mixtures of the same, or dilute orthophosphoric acid,—in fact, "phosphoric acid" is used and refers to any of the hydrates of phosphorus produced or combination thereof; and "aqueous fluid," as used specifically in reference to the hydration of phosphorus pentoxide to metaphosphoric acid and cooling the hot gaseous mixture, either prior to or after admission into the packed column, refers to water, dilute orthophosphoric acid, or any other suitable aqueous fluid.

It will be seen, therefore, that this invention actually may be carried out by the use of various modifications and changes without departing from its spirit or scope, with only such limitations placed thereon as may be imposed by the prior art.

This application is a continuation-in-part of my application Serial No. 192,742, filed February 26, 1938.

I claim:

1. A process for separating hydrated phosphorus pentoxide from phosphorus combustion products containing water vapor in excess of that required to hydrate the phosphorus pentoxide therein which comprises (a) passing said combustion products upwardly thru a packed separating column, (b) cooling the top of said column sufficiently to provide a contact liquid over said packing, (c) maintaining the flow of said combustion products thru said column at a velocity such that said column is maintained just below its loading or flooding point, (d) regulating the temperature of said combustion products entering said column to a temperature required for the production of a flowable phosphoric acid of a predetermined concentration of phosphorus pentoxide, and (e) withdrawing said phosphoric acid from near the bottom of said column.

2. The process according to claim 1 wherein (a) an aqueous liquid is admitted to near the top of said packed separating column in an amount required to provide sufficient contact liquid to maintain said column just below its loading or flooding point.

3. The process according to claim 1 wherein (a) an aqueous liquid is admitted to near the top of said packed separating column in an amount required to provide sufficient contact liquid to maintain said column just below its loading or flooding point, and (b) an aqueous liquid is dispersed in said combustion products containing hydrated phosphorus pentoxide in an amount sufficient to regulate the temperature of said combustion products entering said column to the temperature required for the production of a flowable phosphoric acid of a predetermined concentration of phosphorus pentoxide.

4. The process according to claim 1 wherein (a) the gaseous mixture from which most of the phosphorus pentoxide has been separated in said column is cooled sufficiently to condense a portion of the water vapor therein together with substantially all of the remainder of the hydrated phosphorus pentoxide to form a condrated condensate of dilute aqueous solution of orthophosphoric acid, and (b) said condensate is admitted to near the top of said column to provide cooling therein.

5. The process according to claim 1 wherein (a) the gaseous mixture from which most of the phosphorus pentoxide has been separated in said column is cooled sufficiently to condense a portion of the water vapor therein together with substantially all of the remainder of the hydrated phosphorus pentoxide to form a condensate of dilute aqueous solution of orthophosphoric acid, (b) a portion of said condensate is admitted to near the top of said column to provide cooling therein, and (c) the remainder of said condensate is dispersed in said combustion products to provide in part the regulation of the temperature of said products entering said column.

6. The process according to claim 1 wherein (a) said combustion products are passed upwardly thru said column packed with one-inch Raschig rings at a velocity of 8 to 10 feet per second to maintain said column just below its loading or flooding point.

7. The process according to claim 1 wherein (a) said column packed with one-inch Raschig rings is maintained just below its loading or flooding point by regulating the pressure drop of phosphorus combustion products thru the packing to the order of 15 to 30 inches of water.

WILLIAM H. BASKERVILL.

CERTIFICATE OF CORRECTION.

Patent No. 2,303,318.  December 1, 1942.

WILLIAM H. BASKERVILL.

It is hereby certified that error appears in the printed specification of the above numbered patent requiring correction as follows: Page 4, first column, line 24, for "pint" read --point--; line 32, for "of a 2" read --of 2--; and second column, line 40, for "heigth" read --height--; lines 55 and 61, for "successfully" read --successively--; and that the said Letters Patent should be read with this correction therein that the same may conform to the record of the case in the Patent Office.

Signed and sealed this 12th day of January, A. D. 1943.

(Seal)

Henry Van Arsdale,
Acting Commissioner of Patents.